United States Patent

Parker

[11] Patent Number: 5,956,903
[45] Date of Patent: Sep. 28, 1999

[54] HIGH-WIND VELOCITY BUILDING PROTECTION

[76] Inventor: Fred Parker, Pheasant Run, Gwynedd Valley, Pa. 19437-0321

[21] Appl. No.: 09/094,656

[22] Filed: Jun. 15, 1998

Related U.S. Application Data

[60] Provisional application No. 60/062,827, Oct. 20, 1997.
[51] Int. Cl.$^6$ .................. E04H 9/14; E04H 9/16
[52] U.S. Cl. .................. 52/1; 52/741.3; 49/31; 454/194
[58] Field of Search .................. 52/1, 741.3; 49/24, 49/31; 454/194, 196

[56] References Cited

U.S. PATENT DOCUMENTS

| | | | |
|---|---|---|---|
| 3,204,585 | 9/1965 | Carlisle | 52/1 X |
| 3,521,546 | 7/1970 | Day | 52/1 X |
| 4,144,802 | 3/1979 | Babin | 52/1 X |
| 5,226,256 | 7/1993 | Fries et al. | 49/24 X |

*Primary Examiner*—Christopher Kent
*Attorney, Agent, or Firm*—Jim Zegeer

[57] ABSTRACT

In many storms, high-wind velocity can cause severe damage to building structures by virtue of differential pressures caused by high-wind velocity winds traversing the structure, creating differential inside-outside pressures. Extremely low pressure on the downwind side of the structure causing higher internal pressures inside the structure to lift the roof or burst out windows and the like on the downwind side of the structure. The destructive effects of high-velocity winds on building structures are avoided by providing the building with controlled openings on the various surfaces of the building. Air pressure sensing devices sense pressure differentials caused by high-velocity winds on the upwind and downwind sides of the building and controlling the pressure control opening such that the high-pressure surface opening is closed and the low-pressure surface control opening is opened.

7 Claims, 3 Drawing Sheets

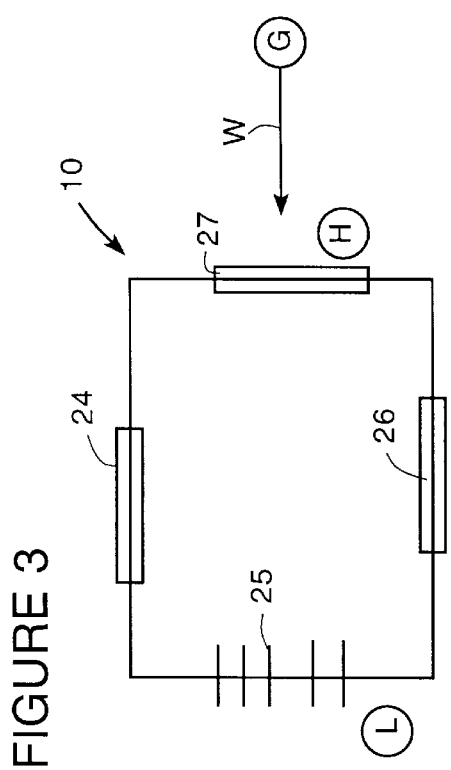
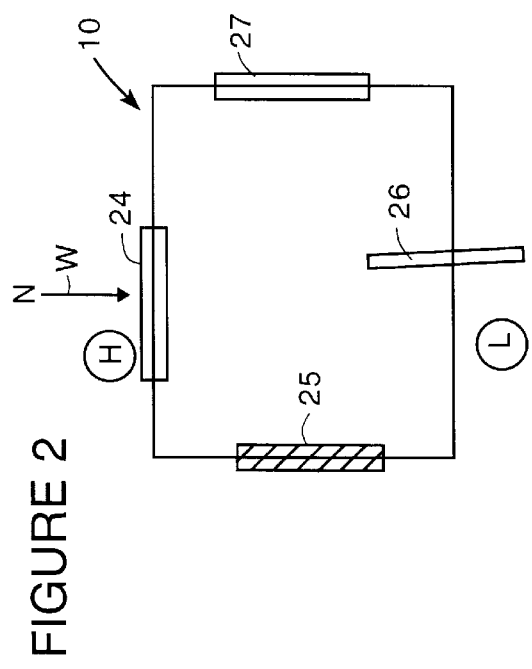
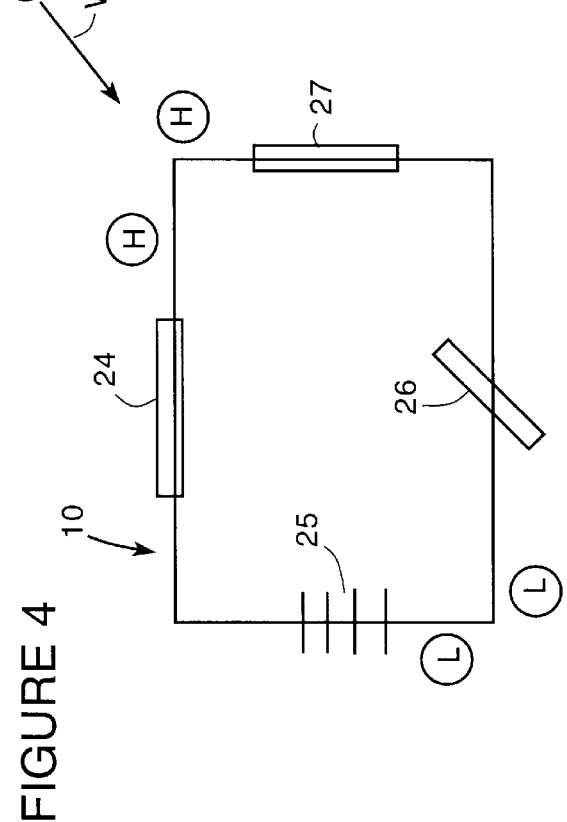

HIGH-WIND VELOCITY BUILDING PROTECTION

REFERENCE TO RELATED APPLICATION

This application is the subject of provisional application Ser. No. 60/062,827 filed Oct. 20, 1997 and entitled HIGH-WIND VELOCITY BUILDING PROTECTION.

The present invention is directed to providing high-wind velocity protection to buildings and structures in various kinds of storms and severe climatic conditions.

In many storms, for example hurricanes, high-wind velocity can cause severe damage to building structures by creating differential inside-outside pressures. Extremely low pressure on the downwind side, and possibly over the roof, of the structure may cause higher internal pressures inside the structure to lift the roof and/or burst out windows and the like on the downwind side of the structure. In the case of tornadoes, a sudden reduction in pressure outside the structure can cause the internal pressure to cause damage.

The object of the present invention is to provide a protection system to reduce the affects of high-velocity winds and low ambient pressures on building structures.

According to the invention, the building is provided with controlled openings connecting the inside and the outside of the building and sensing means for sensing the pressure differentials caused by high-velocity winds on the various surfaces of the building and controlling the openings in those surfaces so that the high-pressure sides or surfaces are closed and low-pressure sides or surfaces are opened. It will be appreciated that the term "surfaces" includes building sidewalls, roofs, soffits, etc.

DESCRIPTION OF THE DRAWINGS

The above and other objects, advantages and features of the invention will become more apparent when considered with the following specification and accompanying drawings wherein:

FIG. 2 is a schematic illustration of the application of the invention with the wind coming from the first direction, FIG. 3 is a schematic illustration of a building structure incorporating the invention with the wind coming from a further direction, and FIG. 4 is a schematic illustration of a building structure incorporating the invention with the wind coming from a third direction.

DETAILED DESCRIPTION OF THE INVENTION

Figure 1:
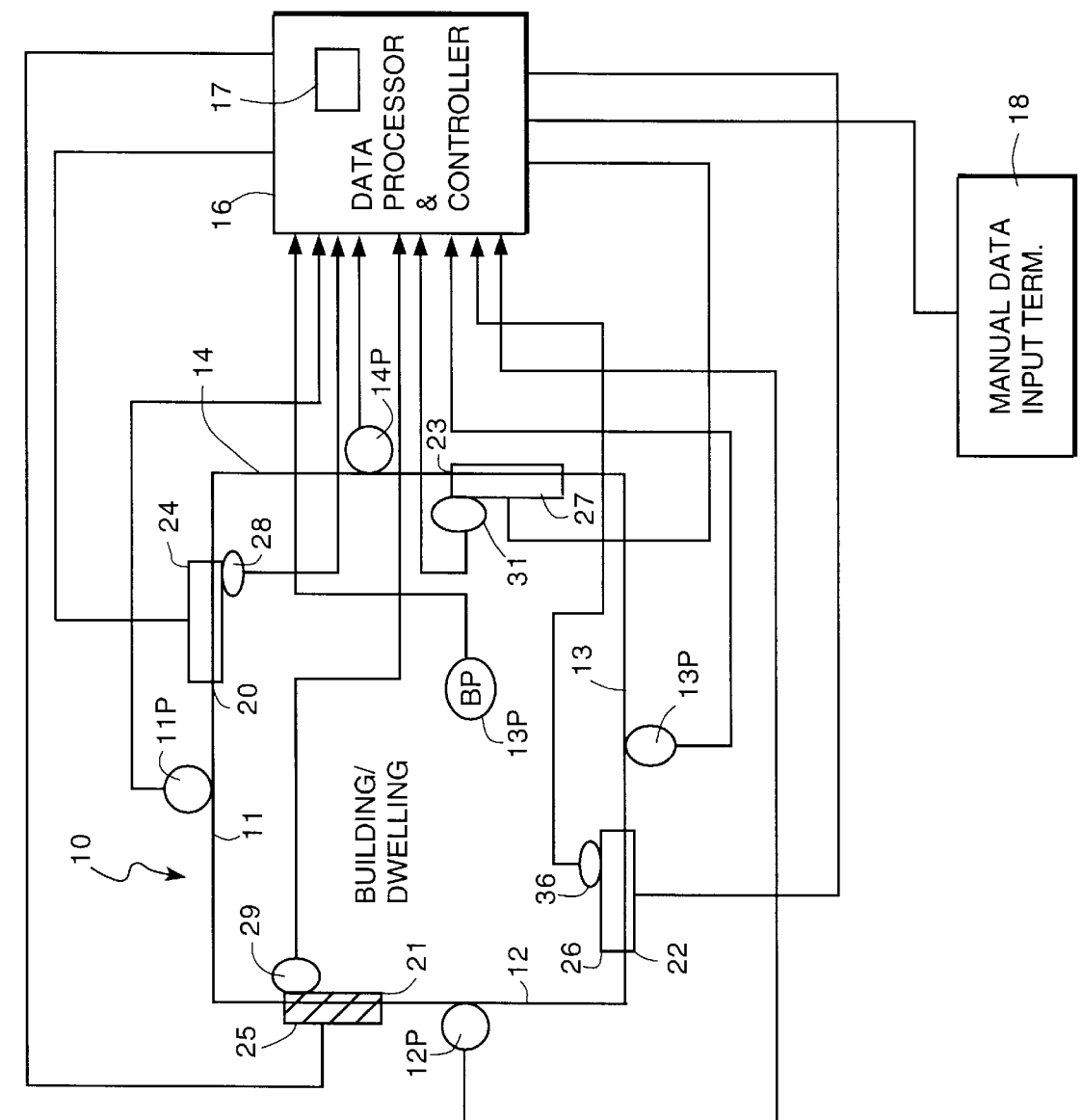
FIG. 1 is a schematic block diagram of a building dwelling structure incorporating the invention.

Referring now to FIG. 1 of the drawings, a building/dwelling structure 10 situated in an area of possible high-velocity winds is illustrated in this embodiment as having four sides or surfaces 11, 12, 13 and 14. The term "surfaces" refers to walls, roofs, soffits, etc. Each side or surface is provided with pressure sensors 11P, 12P, 13P and 14P, all of which are connected to a data processor controller 16 which may include a microprocessor 17. Pressure sensors 11P, 12P, 13P and 14P serve as data inputs to data processor and controller 16. A manual data input terminal 18 may optionally be provided to provide manual data input.

Building 10 is also provided with openings 20, 21, 22 and 23 with opening operators 24, 25, 26 and 27 and sensors 28, 29, 30 and 31 which sense the open or closed status of the opening. It will be appreciated that the opening may be a door, a louvered or unlouvered window, or an opening that is constructed specifically for the purposes of pressure equalization according to the invention as described herein. While, in the preferred embodiment, the opening and closing of the openings is by motor control, it will be appreciated that in a rudimentary aspect of the invention, the openings may be opened and closed manually according to data generated by the data processor and controller. In the preferred embodiment, sensors 28, 29, 30 and 31, which sense the open or closed condition of opening means 20, 21, 22 and 23, respectively, are fed to data processor and controller 16.

A basic feature of the invention is the opening or closing of selected controlled openings of the building according to a sensed pressure differential due to high-wind velocity conditions. According to the invention, the high-pressure surface openings of the building structure are closed; and the low pressure surface openings are open. Referring to the example given in FIG. 2, wind W which has exceeded a given threshold WT has caused the pressure on the upwind side of building 10 to be high and the pressure on the downwind side to be low, signified by the high- and low-pressure indicators H and L. This will result in the closing of opening 20 by motorized opening operator 24 and the opening of opening 22 by motorized opening operator 26 as indicated. In FIG. 2, the wind is a northerly wind coming from a northern direction. In FIG. 3, the wind W is coming from an easterly direction indicated by wind direction indicator E so that the pressure on the upwind side of the building 10 is high (H) and the pressure on the downwind side is low (L). The pressure sensors 14P and 12P reflect a pressure differential which is sensed by data processor and controller 16 to cause and direct the motor controllers to close opening operator 27 and open opening operator 25 so that the pressure internally in the building is equalized with the low pressure thereby helping to avoid damage to the building.

An advantageous and preferred feature of the invention is that since the invention operates on pressure differentials low-cost pressure sensors can be used.

In FIG. 4, the wind W is shown coming from a northeasterly direction which may result in the pressure on the northern and eastern sides of the building to be, perhaps, relatively high and the pressure on the building sides 12 and 13 to be, perhaps, relatively low. These pressure conditions are coupled to the data processor and controller 16 which then causes the controls to exert a closure of opening operators 24 and 27 and an opening of the opening operators 25 and 26, respectively. Regardless of whether the pressure on the northern and eastern sides is higher or lower than the pressure on the southern and western sides the controller will in any case open the openings on the low-pressure surface of the building. This illustrates that opening based or pressure is much more reliable than opening based or wind direction.

It will be appreciated that in terms of a hurricane, when the wind direction can change in a short period of time, the high-velocity wind can cause a shift in the pressure differential so that what would be the high-pressure side 11 in connection with FIG. 2 and low-pressure side 13, can, in a short period of time, change so that in FIG. 2 the low pressure side will be the high-pressure side and the high-pressure side will be the low-pressure side resulting in a reversal of the opening and closing of operators 24 and 26 and vice versa.

In another embodiment, an internal pressure sensor senses the internal building pressure which is compared with the external building pressures 11P, 12P, 13P and 14P. Depending on the direction and strength of the difference, the various openings can all be opened, or some opened and some closed, to provide protection.

Figure 5A:
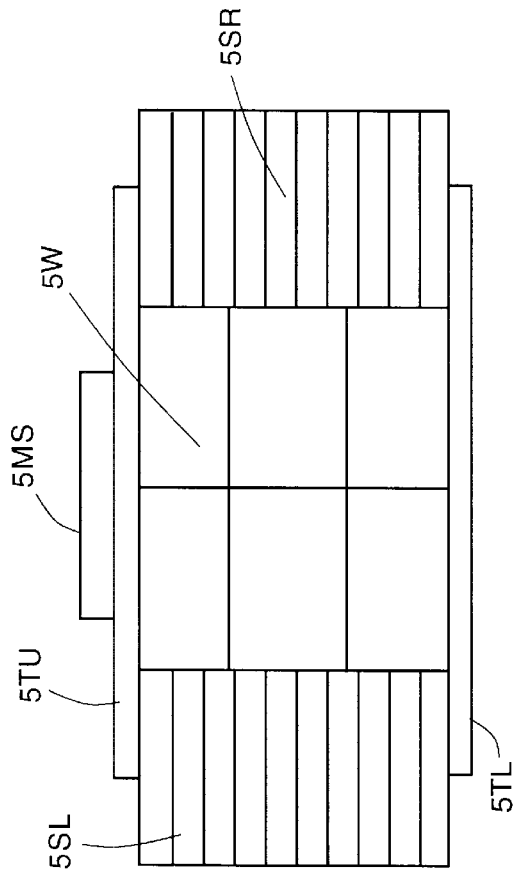
FIGS. 5A and 5B show an integrated shutter-window arrangement.
Figure 5B:
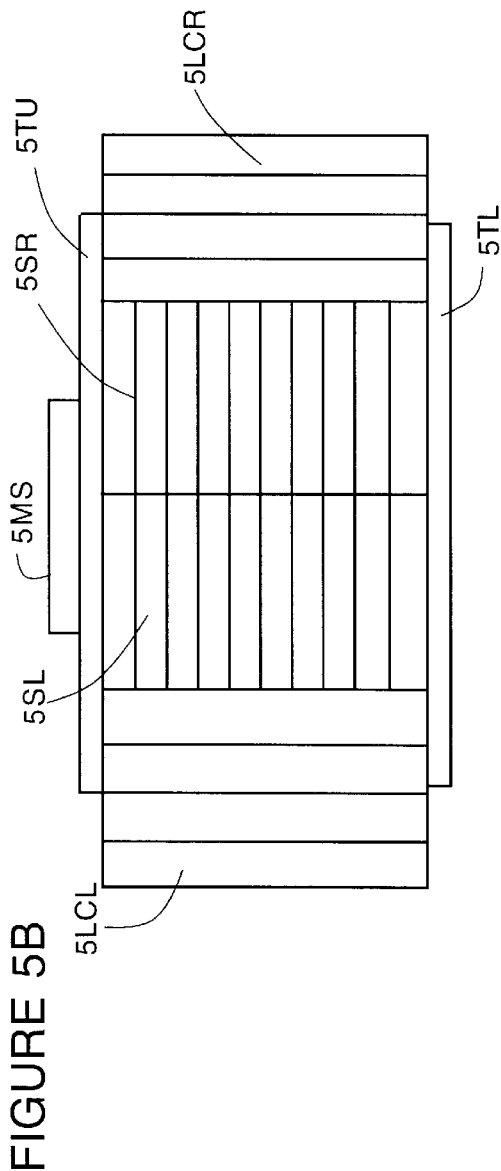

One embodiment of this invention comprises an integrated shutter-window arrangement in which the vents are located next to a window and covered by louvered shutters. As shown in FIGS. 5A and 5B, a window 5W is provided with shutters 55L and 55R which are mounted or pivoted in tracks 5TU and 5TL and operated by motors or solenoids 5MS. Louver-controlled openings 5LCL and 5LCR are mounted in the building wall adjacent the window 5W and positioned to be behind the shutters as shown in FIG. 5A or exposed when the shutters are closed as shown in FIG. 5B. When the pressure transducer senses a threshold pressure differential it produces a signal which causes shutters 55L and 55R to move inward to protect the windows 5W and the louvered vent 5LCL and 5LCR open, covering and protection the window 5W and exposing the louvered vents 5LCL and 5LCR. A variety of mechanisms may be used to accomplish this, such as solenoids or motors. Or the shutters 53L and 55R may be spring loaded and latched. When triggered, the latch could open causing the shutters to close automatically.

In addition, to the automatic operation of the system, triggered by the pressure transducer, it is also possible to remotely trigger all, or a part of the system. This could be accomplished, using existing technology, by means of a telephone call.

While a preferred embodiment has been illustrated and described, it will be appreciated that other modifications, adaptations and changes to the invention will be readily apparent to those skilled in the art.

What is claimed is:

1. A system for protecting a building having various surfaces from the differential pressure affects caused by high-velocity winds comprising:

pressure sensors on various external surfaces of the building for sensing air pressure thereon, opening control means on the various surfaces of said building, a controller, means for coupling signals from said pressure sensors to said controller, and means controlled by said controller for opening the opening control means on a low-pressure side of said building and closing the opening means on a high-pressure side of said building.

2. The system for protecting a building as defined in claim 1 wherein said building has windows on at least some of said various external surfaces, said opening control means being positioned adjacent said windows, and shutter means mounted on said at least some of said various surfaces, shutter operating means for moving said shutter means from a position in front of said opening control means to a position in front of said windows.

3. A system for protecting a building from the differential pressure effects between internal and ambient pressures caused by high-velocity winds comprising:

pressure sensors for sensing differential in air pressure between the internal pressure and the ambient pressure, at various external surfaces of said building, opening means at the various external surfaces of said building, opening control means at each opening means, a controller, means for coupling signals from said pressure sensors to said controller, and means controlled by said controller for opening the opening means on a low-pressure surface of said building and closing the opening means on a high-pressure surface of said building.

4. The system for protecting a building as defined in claim 3 wherein said building has windows on at least some of said various external surfaces, said opening control means being positioned adjacent said windows, and shutter means mounted on said at least some of said various surfaces, shutter operating means for moving said shutter means from a position in front of said opening control means to a position in front of said windows.

5. A method of preventing the destructive effects of high-velocity winds on building structures, said building structures having various external surfaces, comprising providing the building with controlled openings on the various surfaces of the building, sensing air pressure differentials caused by high-velocity winds on the various external surfaces of the building and controlling the controlled openings such that the surface control opening on a high-pressure side is closed and the surface control opening on a low-pressure side is opened when the air pressure differential exceeds a predetermined level.

6. The method defined in claim 5 wherein said building has windows on at least some of said various external surfaces, said controlled opening being positioned adjacent said windows, providing shutters on said at least some of said various surfaces and moving said shutters from a position in front of said controlled opening to a position in front of said windows.

7. A building having upwind and downwind external surfaces and controlled openings on the external surfaces of the building, air pressure sensing devices for sensing pressure differentials caused by high-velocity winds on the upwind and downwind surfaces of said building, and means controlling the controlled openings such that a high-pressure surface controlled opening is closed and a low-pressure surface controlled opening is opened whereby destructive effects of high-velocity winds on the building are avoided.

* * * * *